United States Patent
Cooper et al.

(10) Patent No.: US 7,099,040 B1
(45) Date of Patent: Aug. 29, 2006

(54) METHOD FOR ENABLING A CLIENT TO SPECIFY THE CHARACTERISTICS OF AN IMAGE TO BE DOWNLOADED FROM A SERVER

(75) Inventors: Michael Richard Cooper, Austin, TX (US); Mark Joseph Hamzy, Round Rock, TX (US); Scott Thomas Jones, Austin, TX (US); Mark Wayne VanderWiele, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/434,765

(22) Filed: Nov. 4, 1999

(51) Int. Cl.
  *G06F 15/00* (2006.01)
(52) U.S. Cl. ............... 358/1.9; 345/589; 345/590; 358/426.14; 358/426.13; 382/244; 382/247
(58) Field of Classification Search ............ 358/1.2, 358/3.21, 403, 388, 451, 523, 1.9, 426.13, 358/426.14, 426.02; 364/514 A; 395/500, 395/200.09, 133; 348/384–440, 441; 345/428, 345/329; 341/50–107; 375/240–241; 382/244–247
See application file for complete search history.

(56) References Cited

U.S. PATENT DOCUMENTS

| | | | | |
|---|---|---|---|---|
| 5,179,651 A | * | 1/1993 | Taaffe et al. ............ | 345/555 |
| 5,442,749 A | * | 8/1995 | Northcutt et al. ........ | 709/219 |
| 5,745,909 A | | 4/1998 | Perlman et al. | |
| 5,764,235 A | * | 6/1998 | Hunt et al. ............ | 345/428 |
| 5,911,044 A | * | 6/1999 | Lo et al. ............ | 709/203 |
| 6,098,092 A | | 8/2000 | Padzensky ............ | 709/203 |
| 6,167,442 A | | 12/2000 | Sutherland et al. ...... | 709/217 |
| 6,362,836 B1 | | 3/2002 | Shaw et al. ............ | 345/744 |

FOREIGN PATENT DOCUMENTS

EP      0844788      5/1998
EP      0848559      6/1998

OTHER PUBLICATIONS

IBM Technical Disclosure Bulletin, Method for Web Browser to Project Download Times and Adjust Behavior Accordingly, Nov. 1997, vol. 40 No. 11, pp. 125-126.

* cited by examiner

*Primary Examiner*—Thomas D. Lee
*Assistant Examiner*—Heather D. Gibbs
(74) *Attorney, Agent, or Firm*—Duke W. Yee; Jeffrey S. LaBaw; Rakesh Garg

(57) ABSTRACT

A method for serving an image from a server to a client, e.g., a computer having a browser or other graphics viewing engine. The user of the client first specifies a set of one or more bitmap characteristics for an image transfer, with at least one of the bitmap characteristics including a number of bits per pixel. Preferably, this specification is accomplished using an applet or other piece of code that is downloaded to the client from the server. Later, when the server receives a client request that includes data identifying a specified bitmap characteristic, a server processing routine (e.g., a servlet) generates a version of the image that conforms to the specified bitmap characteristic. This version is then delivered back to the client in response to the original request. In this way, the user of the client machine can control the particular characteristics of the image files that are delivered to his or her machine.

16 Claims, 3 Drawing Sheets

METHOD FOR ENABLING A CLIENT TO SPECIFY THE CHARACTERISTICS OF AN IMAGE TO BE DOWNLOADED FROM A SERVER

BACKGROUND OF THE INVENTION

1. Technical Field

The present invention relates generally to transmission of image content in a computer network and, in particular, to a method for enabling a user of a client machine to negotiate the format of an image to be transferred to the client machine from a server in the network.

2. Description of the Related Art

The World Wide/Web is the Internet's multimedia information retrieval system. In the web environment, client machines effect transactions to web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and, in return, receives in return a document or other object formatted according to HTML. A collection of documents or objects supported on a web server is sometimes referred to as a web site.

Many web pages include high resolution images or graphics. When it is desired to transmit an image over the Internet, typically either the entire image is transferred or, alternatively, a smaller, low-resolution version is served. An example of a low-resolution image is a thumbnail image, which the user may review and then select to control the browser to fetch the full resolution image. Transmission of a thumbnail image instead of the full resolution image it represents conserves significant bandwidth and network resources.

It is also known in the prior art to provide software routines at both a client and a server in a distributed computer network to enable the amount of data in a graphical image that is to be transmitted (i.e. from server to client) to be customized in according with client and/or server-supplied information. Such a technique is described in U.S. Pat. No. 5,764,235 to Hunt et al. In this patent, each of the client and server include a dedicated handshake process that allows the machines to first determine whether they both support the image customization functionality. If so, then the server may then use an image customization process on images to be transmitted to the client to selectively modify the amount of data and the format of the graphical image files to be sent to the client in response to a request for the image. In performing the image customization process, the server makes use of server image control data and/or client image control data. The client image control data is data or information obtained from the client that is useful in determining both the suitable amount of data and/or format for the graphical image files to be sent. Typically, such data includes user data and client system data. The user data may include user preference, intended use, or a specific quality level. The client system data includes type of compression supported, transmission performance criteria, and equipment data (e.g., display format, printer format, or the like).

While the technique illustrated in Hunt et al. reduce image transmission time and save network bandwidth, the approach has certain disadvantages. Foremost, the technique proposed by Hunt et al. envisions that a given graphical image file be processed prior to receipt of the client request. According to the patent, the image file is processed to create a modified image file that is partitioned into various additive segments. As more and more of the segments are added together, a better quality image is created. Thus, for example, a first segment can be used for displaying the image as a high quality, thumbnail size image or a low quality, feature size image. By combining this segment with another segment, the resulting image can be used as a high quality, feature size image or a low quality, full screen size image.

Preprocessing the image in accordance with the teachings of the Hunt et al. patent effectively offsets the advantages that are otherwise achieved by sending the customized images. In particular, the generation of the custom segments consumes both processing and storage resources at the server, thus minimizing the value of the technique. In addition, the types of client image control data identified in the patent do not afford the user of the client machine sufficient flexibility to control the characteristics of the actual image transferred.

The present invention addresses these deficiencies of the prior art.

BRIEF SUMMARY OF THE INVENTION

It is a general object of the present invention to enable a user of a client machine to negotiate the bitmap format of a given image to be transferred to the machine from a server in a computer network.

A more specific object of this invention is to enable a user of a client browser to specify given bitmap format characteristics when making a request for a high resolution image supported on the server. In operation, the image is processed "on-the-fly" as it is served in response to the client request to produce a version customized according to the specific request.

By identifying specific image bitmap format characteristics, a significant reduction in transmission time and file storage space can be achieved.

Preferably, the type of bitmap format characteristics that may be specified are quite varied. One particular type of format characteristic is the number of bits per pixel in the image, which is a measure of color depth. Other types of image format characteristics that may be specified when making a request for an image supported on the server include a type of compression method (lossy vs. non-lossy), image loss, or the type of target device.

According to another feature of the invention, the user of the client machine may simply make a coarse selection of the quality of the image he or she desires as a function of the time required to download the particular image file. Preferably, this selection is made using a slider control. Once the slider is set, the particular selection is then translated into appropriate control parameters to select the bits per pixel and bitmap compression format best suited to adapt the images for transfer to the client.

The foregoing has outlined some of the more pertinent objects and features of the present invention. These objects should be construed to be merely illustrative of some of the more prominent features and applications of the invention.

Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

The present invention may be implemented in any client server-based computer network operating environment. In the preferred embodiment described below, the invention is illustrated in the context of an open Internet networking environment wherein users of client machines interconnect to servers that support content to be downloaded, typically via a web-based protocol such as HTTP. While this is a preferred operating environment, one of ordinary skill will appreciate that the principles of the present invention are not limited to use for Web content retrieval between a web site and a client browser. The techniques are useful in any environment in which it is required to transfer an image file between a server and a client, irrespective of the given transfer protocol, system configuration or networking environment.

Figure 1:
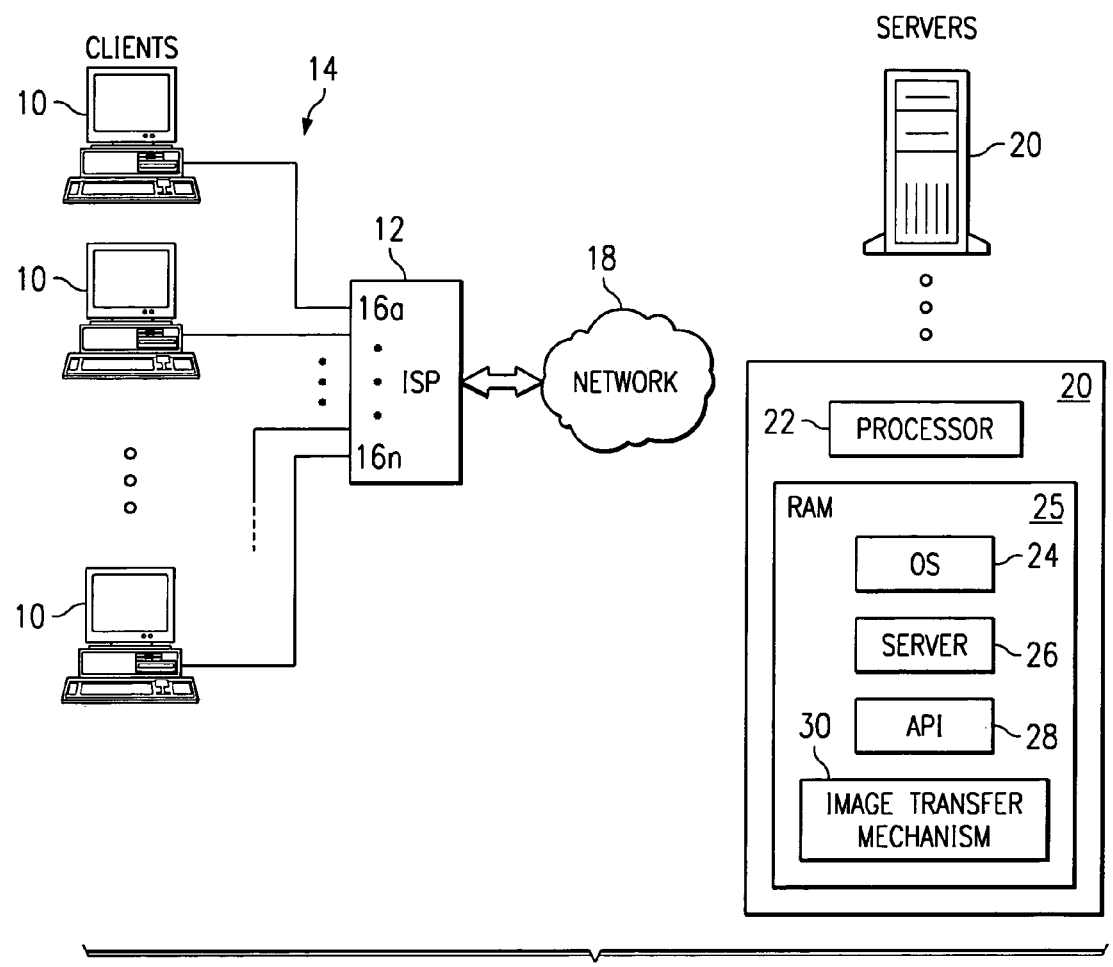
FIG. 1 is a simplified illustration of a client-server environment in which the present invention may be implemented.

With the above caveat, a representative system in which the present invention is implemented is illustrated in FIG. 1. A plurality of Internet client machines 10 are connectable to a computer network Internet Service Provider (ISP) 12 via a network such as a dialup telephone network 14. As is well known, the dialup telephone network usually has a given, limited number of connections 16a–16n. ISP 12 interfaces the client machines 10 to the remainder of the network 18, which includes a plurality of web content server machines 20. Network 18 typically includes other servers for control of domain name resolution, routing and other control functions. A client machine typically includes a suite of known Internet tools, including a Web browser, to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system.

A representative web server 20 comprises one or more processors 22 (e.g., x86, Pentium-based, RISC-based, or the like), a system memory 25 for supporting an operating system 24 (e.g., AIX, Windows NT, Windows '98, Linux, or the like) and a web server program 26 (e.g., IBM Netfinity, WebSphere, or the like). An application programming interface (API) 28 or other interface provides extensions to enable application developers to extend and/or customize the core functionality thereof through software programs including plug-ins, servlets, and the like. One such program is an image transfer mechanism 30 of the present invention. The mechanism provides server-side processing of images as such objects are served to a particular client machine (and, in particular, to a given user at the client machine).

Figure 2:
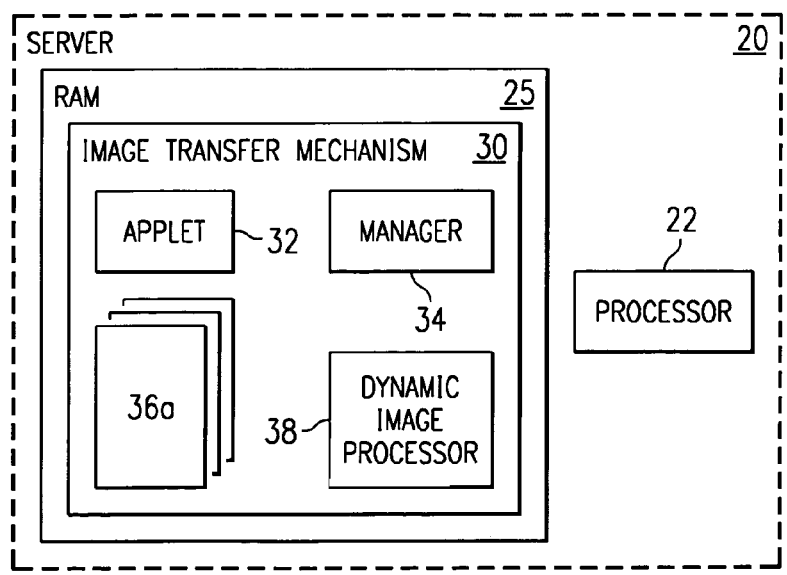
FIG. 2 is a block diagram of the various functional components of the image transfer mechanism of the present invention.

Referring now to FIG. 2, the image transfer mechanism may be implemented most conveniently in software, namely, as a set of instructions that are executed in a processor. Thus, for purposes of illustration, FIG. 2 shows the mechanism 30 as being resident in system memory (e.g., RAM) 25 associated with a given processor 22 operating within the server platform 20. The image transfer mechanism 30 includes several functional components: an applet 32, a manager 34, a set of client response routines 36a–n, and a dynamic image processor 38. The applet 32 comprises a set of Java class files and is adapted to be served to given client machines in the network. The applet 32 is executable in the user's client machine using local resources, e.g., a web browser or other graphics viewer. As will be seen, the applet is designed for execution on the client machine by a particular user to generate a set of image format data that defines the transfer characteristics for a given image. Alternatively, the functionality of the applet 32 may be a client-side plug-in, may be built in to a client browser or provided as a standalone program. Implementation as an applet is desirable as it enables the image transfer mechanism to reside on a given server.

Figure 3:
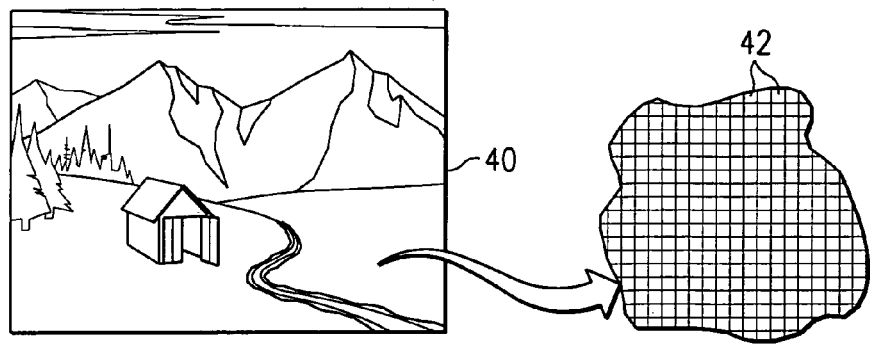
FIG. 3 is a simplified illustration of an image that is decomposed into a plurality of pixel elements.

Generally, the image transfer mechanism enables a user of client machine, e.g., a user of a HTTP-compliant web browser, to specify the particular transfer characteristics of an image to be served to the client machine from a server in the computer network. By way of brief background, and with reference to FIG. 3, a given image 40 to be served to the client machine for display (e.g., on a raster-based image display device, conventionally a CRT) or for printing comprises an equal amount of picture elements, called pixels 42. The amount of color information contained in each pixel is determined by the pixel's depth, or bits per pixel. The more bits per pixel, the more colors, shades, and hues a pixel may contain. Thus, for example, at one bit per pixel, the pixel contains only two colors; however, at eight bits per pixel, the pixel may contain 256 colors. Of course, the more colors in an image, the better the resolution and image quality.

Figure 4:
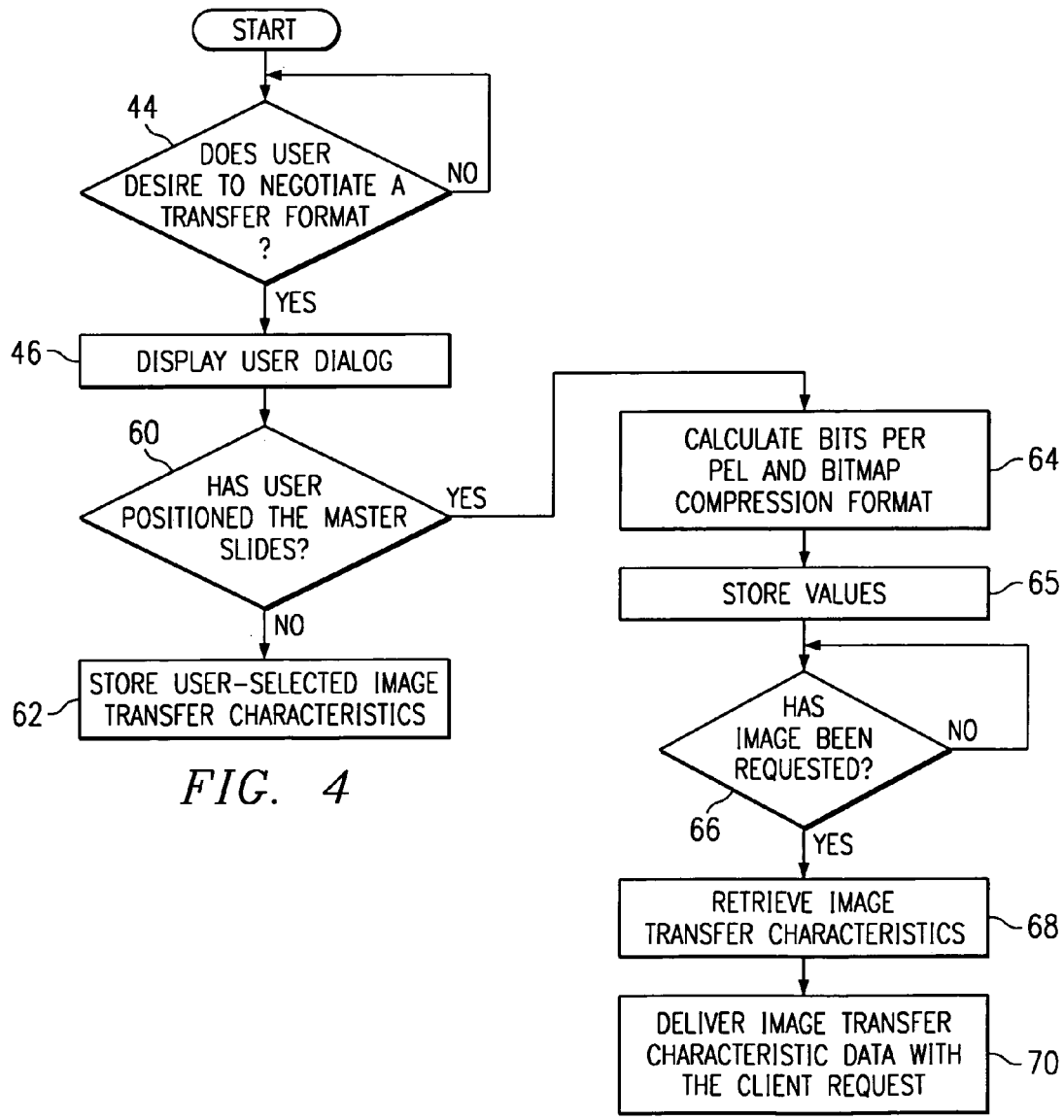
FIG. 4 is a flowchart illustrating a client-side operation of the present invention.
Figure 5:
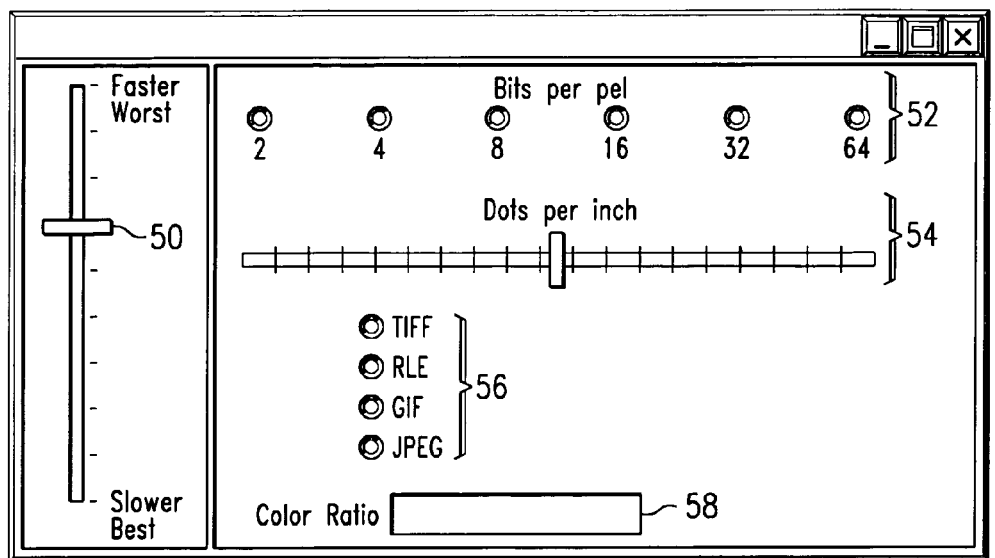
FIG. 5 illustrates a representative client-side user interface for use in the present invention.

FIG. 4 illustrates a flowchart describing the basic client-side operation of the present invention. The routine begins at step 44 to determine whether the user of the client machine desires to negotiate a given image transfer format. If not, the routine cycles. If, however, the user desires to customize the image transfer characteristics (of a given image, or of all images on a page, or the like), the outcome of the test at step 44 is positive. Control then continues at step 46 with the display of a user dialog 48 such as illustrated in FIG. 5. The user dialog 48 preferably is generated by the applet of the image transfer mechanism. Alternatively, the user dialog may be accessed from a browser pull-down menu (if the functionality is built into the browser), or by some other means (e.g., a server-side CGI-based scripting function). Nevertheless, this dialog is merely representative and should not be taken to limit the scope of the present invention.

The user dialog 48 includes a number of graphical controls. A master slider 50 has a number of control positions as determined by the relative placement of the slider. Typically, the slider is positioned using a conventional drag operation, using an input device such as a mouse or trackpad device. As illustrated, the master slider 50 has a topmost position, for the fastest download, and a bottommost position, for the slowest download. As can be seen, the fastest download is associated with the worst quality image, while the slowest download is associated with the best quality image. The user may select a given speed versus quality characteristic by positioning the slider as desired.

As also seen in FIG. 5, the user dialog 48 includes a number of additional controls that may be selected by the user to control a particular image transfer characteristic. Thus, for example, the dialog includes a set of radio buttons 52 that enable the user to select a particular color depth. A secondary slider 54 may be used to select a given number of dots per inch, which is a printer characteristic. Another set of radio buttons 56 may be used to identify a given type of bitmap compression format. In this example, which is merely representative, the user dialog 48 presents four different types of bitmap compression: TIFF (Tagged Image File Format), RLE (Run-Length Encoding), GIF (Graphics Interchange Format), and JPEG (Joint Photographic Experts Group). As is well-known, TIFF, RLE and GIF are representative lossless types of image compression, while JPEG is a representative lossly data compression technique. When the user selects the particular type of compression format, a color ratio value is displayed in the field 58. The dialog also includes various control buttons such as OK, Cancel and Help.

Returning now back to the flowchart of FIG. 4, the client-side routine then tests at step 60 to determine whether the user has positioned the master slider 50. If the result of the test at step 60 is negative, the routine continues at step 62 to store the user-selected image transfer characteristics (i.e. the bit per pel setting, the bitmap compression format, and the like). These values may be conveniently stored in a file on the client. If the result of the test at step 60 is positive, the routine branches to step 64 to calculate the bits per pel and the bitmap compression format that best approximates the user's selection. Control then continues at step 65 to store the generated values. The routine then tests at step 66 to determine whether an image has been requested. An image may be requested in any number of ways. In an illustrative embodiment, the image is requested as part of a web page. When the outcome of the test at step 66 is positive, the routine retrieves the image transfer characteristic data previously stored. This is step 68. At step 70, the image transfer characteristic data is delivered with the client request to the server. This completes the client-side processing.

One of ordinary skill will appreciate that the image transfer characteristic data may be generated at the client machine and then uploaded to the server (at which the image is hosted) in a communication separate from the actual request for the image. Thus, for example, the data may be uploaded and stored at the server in a file uniquely associated with identifying information of the user (e.g., userid and password).

Figure 6:
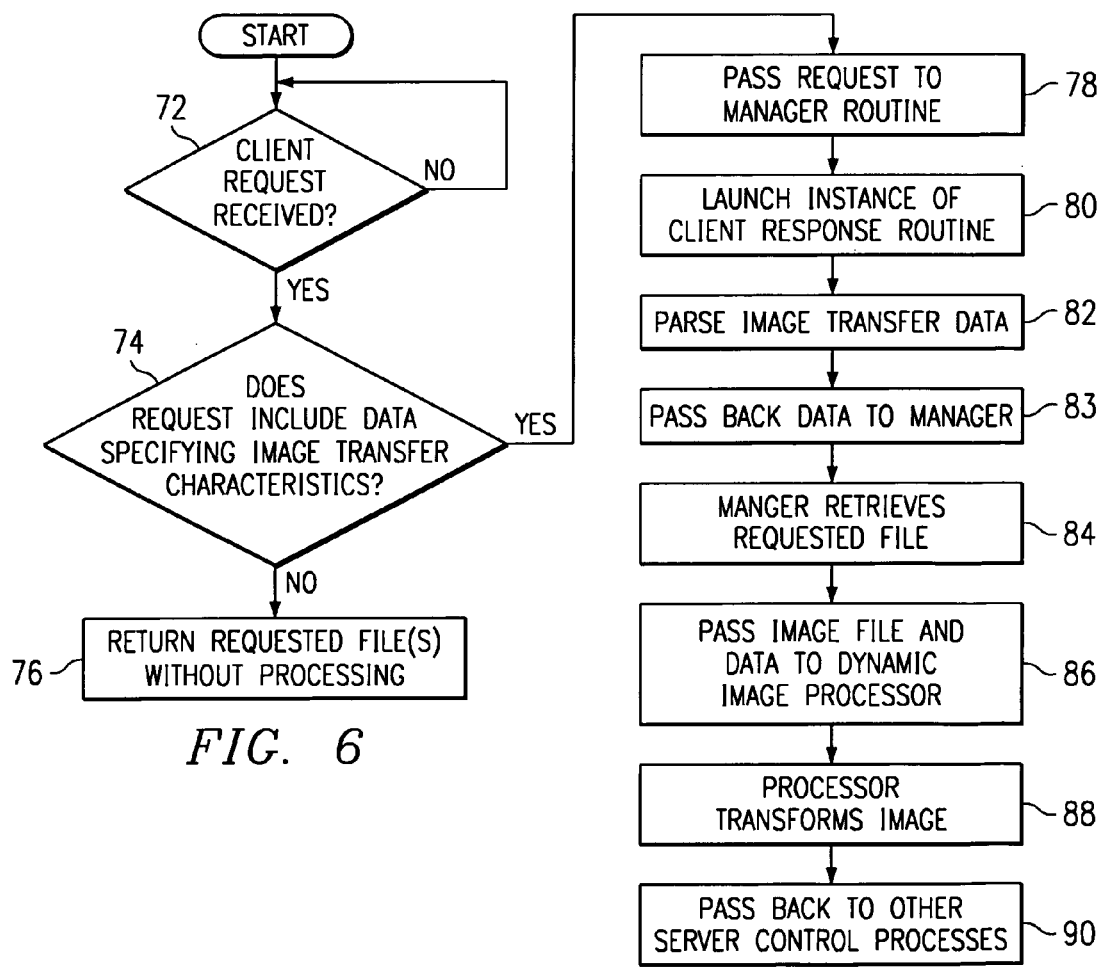
FIG. 6 is a flowchart illustrating a server-side operation of the present invention.

FIG. 6 is a flowchart illustrating the server-side processing of a client request for the image. As noted previously, in the preferred embodiment, a high resolution version of the image is stored on or otherwise accessible from the server. The routine begins at step 72 be testing to determine whether a client request (e.g., an HTTP GET request) has been received. If not, the routine cycles. If, however, a client request has been received, the routine continues at step 74 to determine whether the request includes any data specifying the image transfer characteristics. If the outcome of the test at step 74 is negative, the routine branches to step 76 and returns the requested file(s) without processing the image. If, however, the outcome of the test at step 74, the routine continues at step 78 to pass the request to the manager routine 34 of the image transfer mechanism. At step 80, the manager 34 launches an instance of a client response routine 36. According to a preferred embodiment, each client response routine processes a given client request and is implemented as a Java servlet. Alternatively, the client response routine may be implemented as standalone native code.

Referring now back to FIG. 6, at step 82 the client response routine parses the image transfer data received from (or otherwise associated with) the client request (e.g., if such data were uploaded to and stored at the server earlier). After parsing the data stream, the client response routine returns control back to the manager 34, passing back the image formatting data at step 83. At step 84, the manager retrieves a requested image file. At step 86, the manager then passes the requested image file and the image formatting data to the dynamic image processor 38 of the image transfer mechanism.

Control then continues at step 88. At this step, the dynamic image processor 38, using the formatting data an input, transforms the image into a version that best matches the user's specification. Thus, for example, if the formatting data specifies a RLE encoding as the bitmap compression format, the dynamic image processor 38 encodes the image with this compression format. The dynamic image processor also transforms the image according to the requested color depth (i.e. bits per pel) value of the formatting data. The output of the dynamic image processor is then passed at step 90 to other server control processes as required. Thus, for example, the other server control process may be a routine that generates a data stream to be returned to the client that includes other data besides the processed image. This completes the server-side processing.

The present invention provides many advantages over the prior art. By allowing the user of the client machine to select the color depth, namely the bits per pel, the user has significantly more control over how the image is actually delivered from the server. To provide a concrete example, if the user of the client machine downloads an 8"×11" bitmap of 24 bits per pel for a printer having a resolution of 360×360 dots per inch, the total amount of the download is approximately 33 Mbytes. Using the present invention, the user can modify the bits per pel desired for the download, which greatly reduces the file size and thus the download time. Thus, for example, if the user designates 8 bits per pel, this has the effect of reducing the effective download size to one-third. Thus, the time required to transmit the file from the server to the client will be decreased by a factor of 3×. In like manner, the user can alter the compression technique to facilitate a more efficient download given the available network and/or local resources.

The above-illustrated interface identifies a number of bitmap compression techniques that may be customized by the user of the client machine. One of ordinary skill in the art will recognize, however, that there are numerous other types of graphics file formats that may processed in like manner. Thus, the present invention is not limited to the formats identified in the representative interface. Other conventional compression formats that may be implemented include, without limitation: PNG (Portable Network Graphics), BMP (Microsoft Windows device-independent bitmap format), DIB (Device Independent Bitmap), PCX, WMF (Windows Metafile Format), PAL (Palette File Format), and others. As noted above, preferably the dynamic image processor includes or has access to the particular bitmap processing algorithm that is made available to the user for customizing the file format request.

A representative client on which the applet (or equivalent client-side code) is run is a personal computer, notebook computer, Internet appliance or pervasive computing device (e.g., a PDA or palm computer) that is x86-, PowerPC®- or RISC-based. The client includes an operating system such as IBM® OS/2®, Microsoft Windows, Microsoft Windows CE or PalmOS. As noted above, the client includes a suite of Internet tools including a Web browser, such as Netscape Navigator or Microsoft Internet Explorer, that has a Java Virtual Machine (JVM) and support for application plug-ins or helper applications. The applet is executable in the JVM in a well-known manner.

Generalizing, the above-described functionality thus preferably includes a server side piece and a client side piece. The server side piece comprises the manager, the set of client response routines, and the dynamic image processing routine. As has been noted, the server-side routines may be implemented as a Java servlet or as standalone native code. Some of the image processing routines may be commercially available programs that provide known image compression functions. As also described above, the client side piece is preferably a Java applet, although the client piece may be written in native code. In either case, preferably the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by Letters Patent is set forth in the following claims:

1. A method in a server for serving a first image from the server to a client, comprising the steps of:

receiving a client request from the client, wherein the client request specifies a set of one or more bitmap characteristics for an image transfer, at least one of the bitmap characteristic including a number of bits per pixel;

responsive to receiving the client request, generating a version of the first image for the image transfer that conforms to the set of specified bitmap characteristics;

wherein the first image is stored in a first file, the generating step comprises:

processing data for the first image in the first file to create a second version of the first image for the image transfer that conforms to the set of specified bitmap characteristics;

storing data for the second version of the first image in a second file for transfer to the client, wherein the processing and storing steps are initiated after the client request has been received; and serving the second version of the first image back to the client.

2. The method as described in claim 1 wherein the set of bitmap characteristics includes a bitmap compression format.

3. The method as described in claim 2 wherein the bitmap compression format is lossy.

4. The method as described in claim 2 wherein the bitmap compression format is non-lossy.

5. The method as described in claim 1 wherein the step of generating the version of the image includes processing the image according to the specified bitmap compression format.

6. The method as described in claim 1 wherein the set of bitmap characteristics is specified at the client by setting a graphical control in a graphical user interface.

7. The method as described in claim 5 wherein the graphical control is a slider having first and second positions and a plurality of intermediate positions.

8. The method as described in claim 1 wherein:
the first image is stored at the server;
the client request is specified at the client; and
the second version of the first image for the image transfer is generated at the server.

9. The method as described in claim 8 wherein the client is a computer having a browser for issuing the client request.

10. The method as described in claim 8 wherein the bitmap characteristics include a bitmap compression format.

11. The method as described in claim 8 wherein the bitmap characteristics include a number of dots per inch on a printer associated with the client.

12. The method as described in claim 8 wherein the image is stored at the server in a high resolution format.

13. The method as described in claim 1, wherein the image transfer is for a web page.

14. Method of claim 1, wherein the processing step transforms the data for the image according to a requested color depth value.

15. A method in a server for serving the image from the server to a client, comprising the steps of:

receiving a client request from the client, wherein the client request specifies a set of one or more bitmap characteristics for an image transfer, at least one of the bitmap characteristic including a number of bits per pixel;

responsive to the client request, generating a version of the image for the image transfer that conforms to the set of specified bitmap characteristics; and serving the version of the image back to the client, wherein the set of bitmap characteristics is specified at the client by setting a graphic control, wherein the graphical control is a slider having first and second positions, and a plurality of intermediate positions and wherein the first position selects a subset of bitmap characteristics for a fastest download and lowest quality version of the image.

16. A method in a server for serving an image from the server to a client, comprising the steps of:

receiving a client request from the client, wherein the client request specifies a set of one or more bitmap characteristics for an image transfer, at least one of the bitmap characteristic including a number of bits per pixel;

responsive to the client request, generating a version of the image for the image transfer that conforms to the set of specified bitmap characteristics; and serving the version of the image back to the client, wherein the set of bitmap characteristics is specified at the client by setting a graphic control, wherein the graphical control is a slider having first and second positions and a plurality of intermediate positions, and wherein the second position selects a subset of bitmap characteristics for a slowest download and highest quality version of the image.

* * * * *